United States Patent Office 3,496,608
Patented Feb. 24, 1970

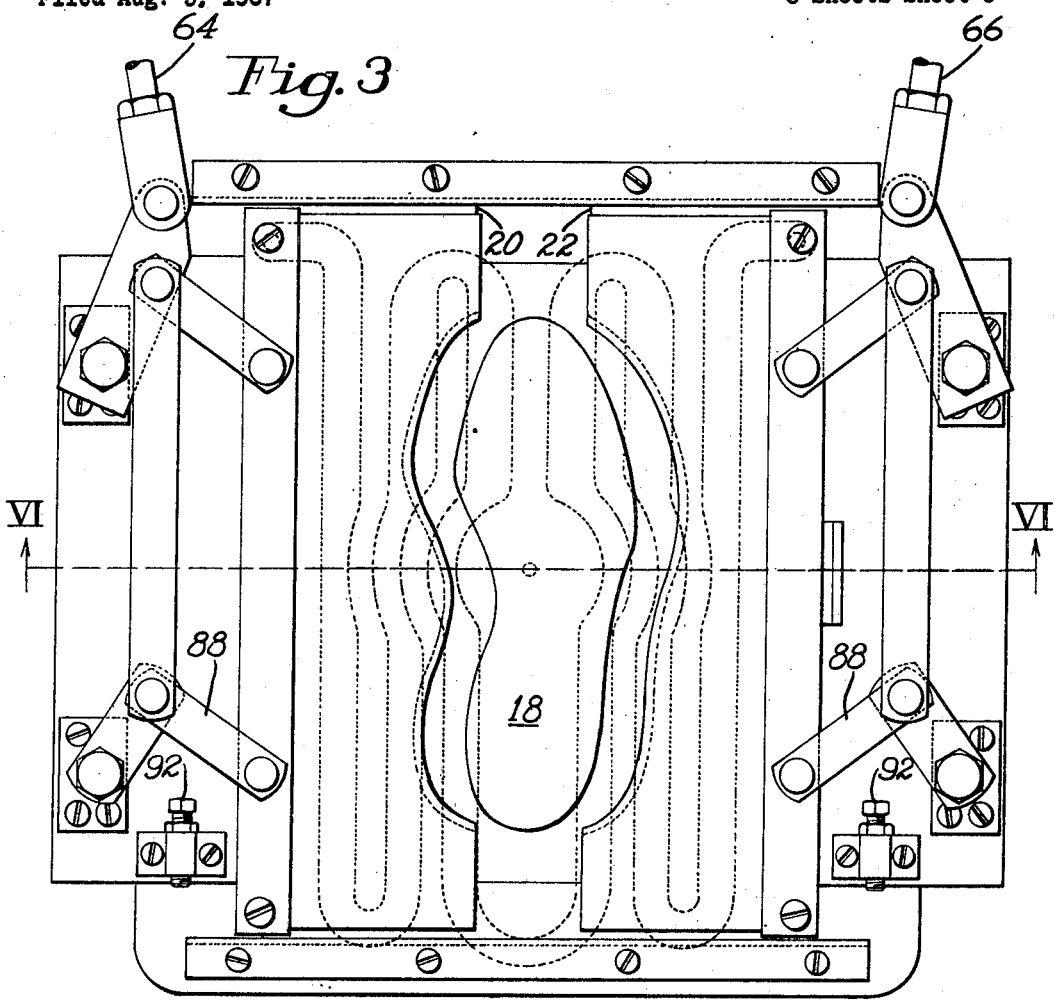
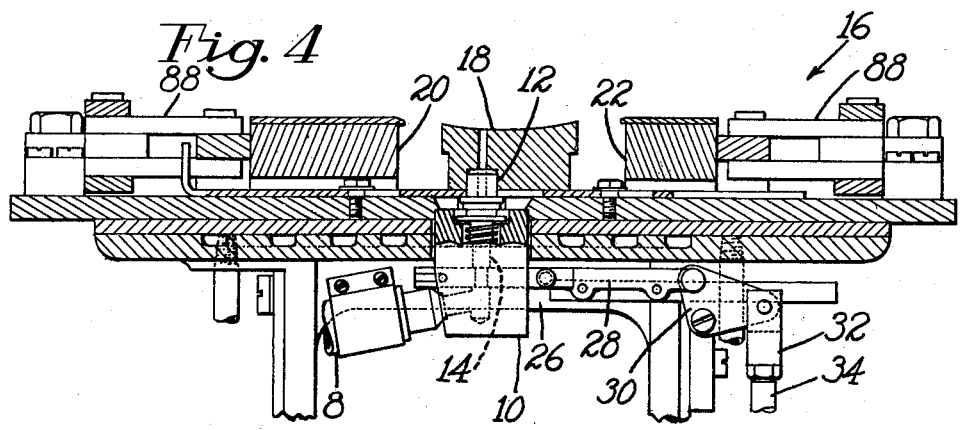

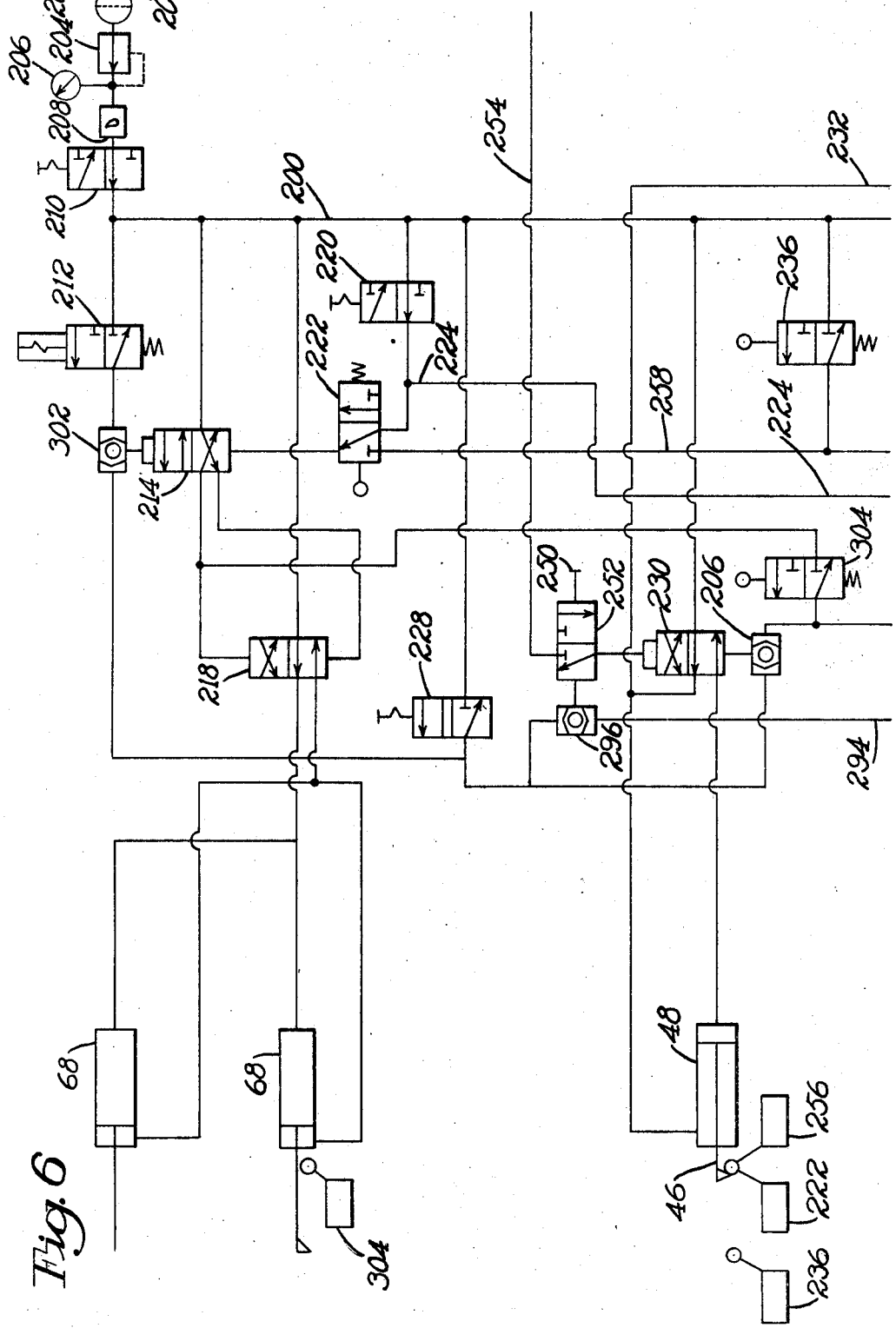

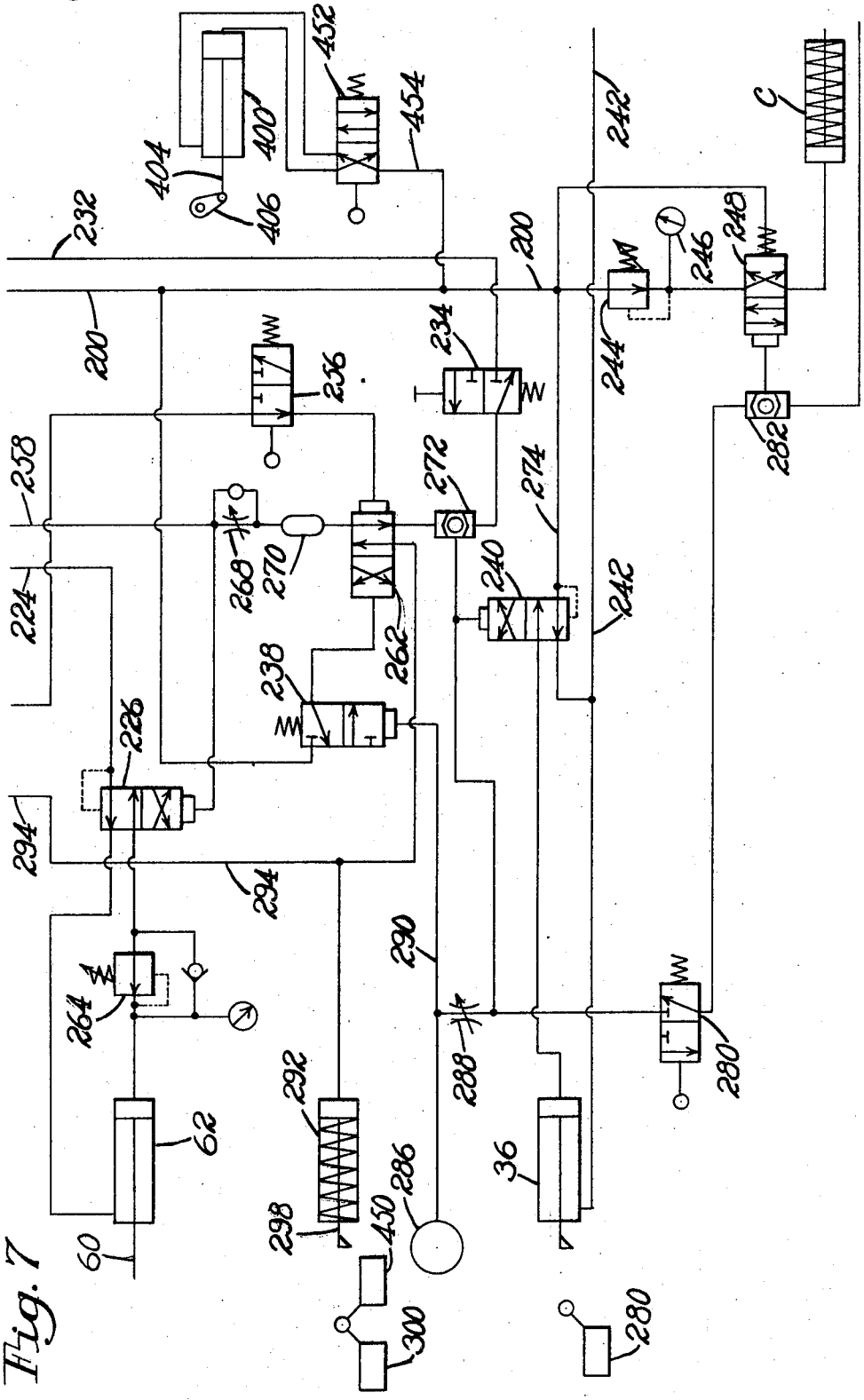

3,496,608
INJECTION SOLE MOLDING MACHINES
Raymond D. E. Eldred and Terence J. L. Clarke,
Leicester, England, assignors to USM Corporation,
a corporation of New Jersey
Filed Aug. 3, 1967, Ser. No. 658,101
Claims priority, application Great Britain, Aug. 10, 1966,
35,727/66
Int. Cl. B29f 1/00
U.S. Cl. 18—30                                                    4 Claims

ABSTRACT OF THE DISCLOSURE

An injection molding machine and method for molding of soles directly onto lasted uppers are disclosed. The machine includes mechanism for moving a footform, with a lasted upper mounted thereon, into engagement with other mold members to form a mold cavity having the shape of a sole and heel unit, means for injecting a molten material into the mold cavity, and mechanism operative, upon completion of the injection operation, to move the footform outwardly from the mold cavity a distance sufficient to relieve pressure in the mold cavity but insufficient to permit escape of the material from the cavity.

BACKGROUND OF THE INVENTION

Field of the invention

This invention relates to injection molding machines and is herein illustrated in its application to machines for molding and attaching sole and heel unit to the bottoms of lasted footwear. A machine of this type is disclosed, for example, in U.S. Letters Patent No. 3,358,333, granted Dec. 19, 1967, in the name of Charles J. Kitchener et al.

Description of the prior art

The patent application above referred to discloses a machine designed for production of shoes having sole and heel units molded in situ. The machine includes one or more stations and at each station there is at least one footform for mounting a lasted upper. The footform is movable into engagement with side mold members, which, together with the footform and a bottom mold member define a sole mold cavity. Upon closing of the mold cavity, automatic mechanism causes injection of molten material, such as plastic or rubber, or a combination of both, into the cavity. When the cavity is filled, the injection is automatically terminated. After a preselected cooling time has elapsed, the mold members open automatically so that the lasted upper, with a sole and heel unit newly molded thereon, may be removed from the footform by an operator.

It has been found advantageous in the molding of foam materials to increase the volume of the mold cavity after the cavity has been filled to permit expansion of the material under the influence of a blowing agent mixed with the molding material.

Furthermore, in the use of solid plastics and rubbers, as opposed to foamed materials, when the material is injected into the mold cavity at high pressure it is often necessary that the mold cavity remain closed for a period of time, of the order of two or three minutes, before sufficient solidification has taken place to permit opening of the mold and removal of the shoe from the footform without deformation of the molded sole. It has been found that by reducing the pressure within the mold cavity immediately after injection and filling of the cavity, the mold may be opened and the shoe removed from the footform with the plastic material of the shoe bottom solidified to a lesser degree, without warping or other deformation of the molded sole.

Hence, there has evolved a demand for a machine of the above described type in which the mold cavity is expandable, after completion of the injection operation, to relieve the pressure of the injection material in the cavity.

Expansion of the mold cavity has been accomplished in the prior art by movement of the bottom mold member. This technique has not proven to be practical in all injection sole molding machines, such as the machine described in the above-cited patent application. This machine, and some other machines of the prior art, is equipped with rather extensive cooling means for the bottom mold member which precludes easily adapting the machine to include a movable bottom mold member.

SUMMARY OF THE INVENTION

Accordingly, it is an object of the present invention to provide an improved machine suitable for increasing the volume of the mold cavity after filling of the cavity with injection molding material.

Another object of the invention is to provide such facility comprising means for moving the footform, after completion of the injection operation, outwardly from the mold cavity to permit expansion of the molded sole in the enlarged cavity.

An additional object of the invention is to provide such means which can readily be incorporated into existing machines.

With the above and other objects in view, the present invention contemplates the provision in a machine of the type described in the above-mentioned patent application, of means for automatically moving the footform, after completion of an injection operation, in a direction outwardly from the mold cavity, whereby to enlarge the cavity to reduce the pressure of the sole material in the mold cavity but not sufficient to permit the escape of sole material between the side mold members and the lasted upper.

In accordance with a further feature of the invention, there is provided a method for injection molding soles directly onto lasted uppers comprising the steps of providing a mold cavity open on one side, moving an upper mounted on a footform into engagement with the mold assembly so as to close the mold cavity, injecting molten material into the cavity until the cavity is filled, and moving the upper outwardly from the mold cavity a distance sufficient to permit reduction of pressure within the mold cavity but not sufficient to permit escape of the injection molding material from the mold cavity.

The above and other features of the invention including various novel method techniques, details of construction and combinations of parts will now be more particularly described with reference to the accompanying drawings and pointed out in the claims. It will be understood that the particular method and the machine embodying the invention are disclosed by way of illustration only and not as limitations of the invention. The principles and features of this invention may be employed in varied ways and in numerous embodiments without departing from the scope of the invention.

BRIEF DESCRIPTION OF THE DRAWINGS

FIG. 3 is a plan view of one illustrative mold assembly;

FIG. 4 is a sectional view of the mold assembly, taken along line IV—IV on FIG. 3;

FIGS. 6 and 7 are diagrammatic drawings, showing the pneumatic system employed by one station of the machine.

DESCRIPTION OF THE PREFERRED EMBODIMENT

Figure 1:
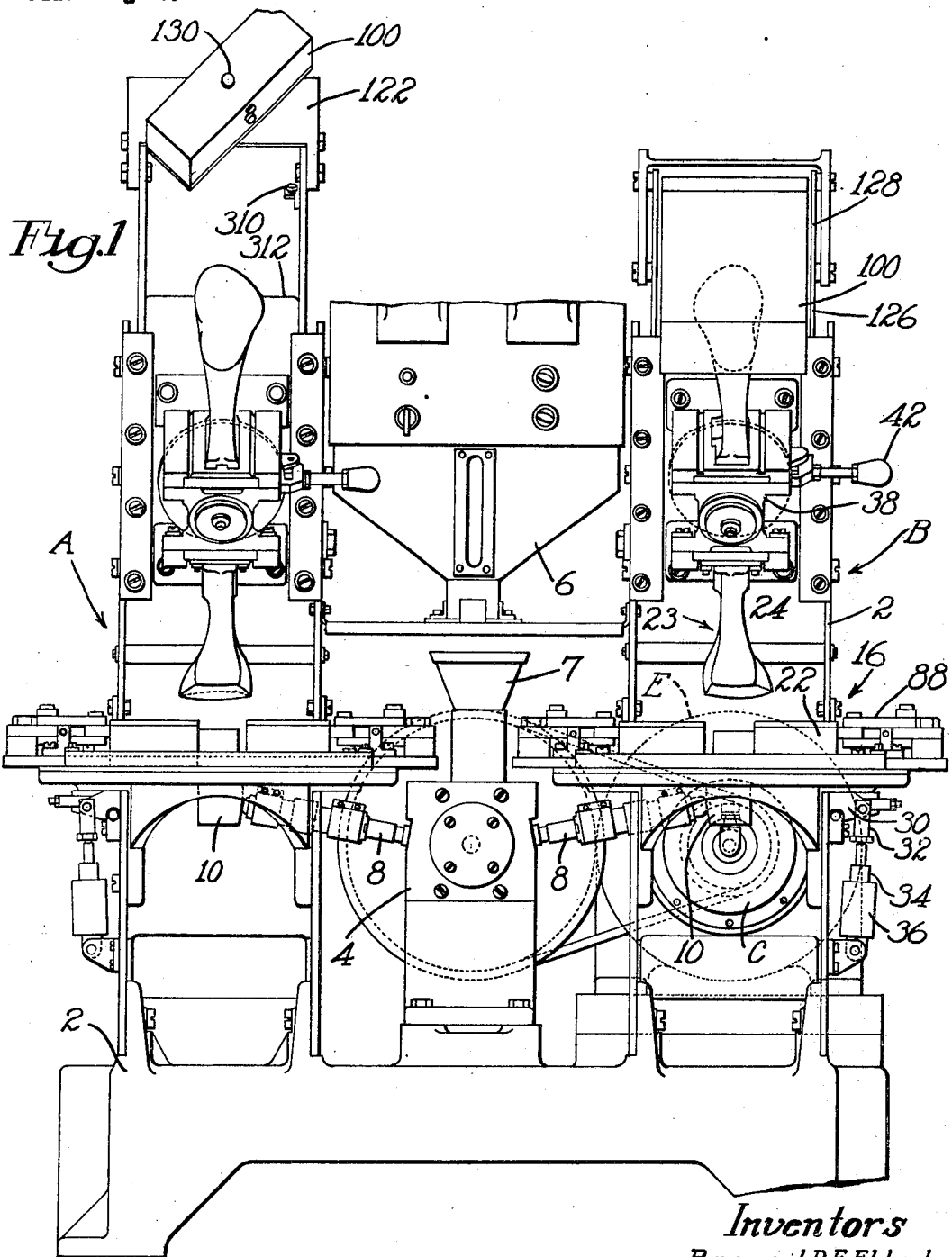
FIG. 1 is a front elevational view of one form of injection molding machine illustrative of an embodiment of the invention.
Figure 2:
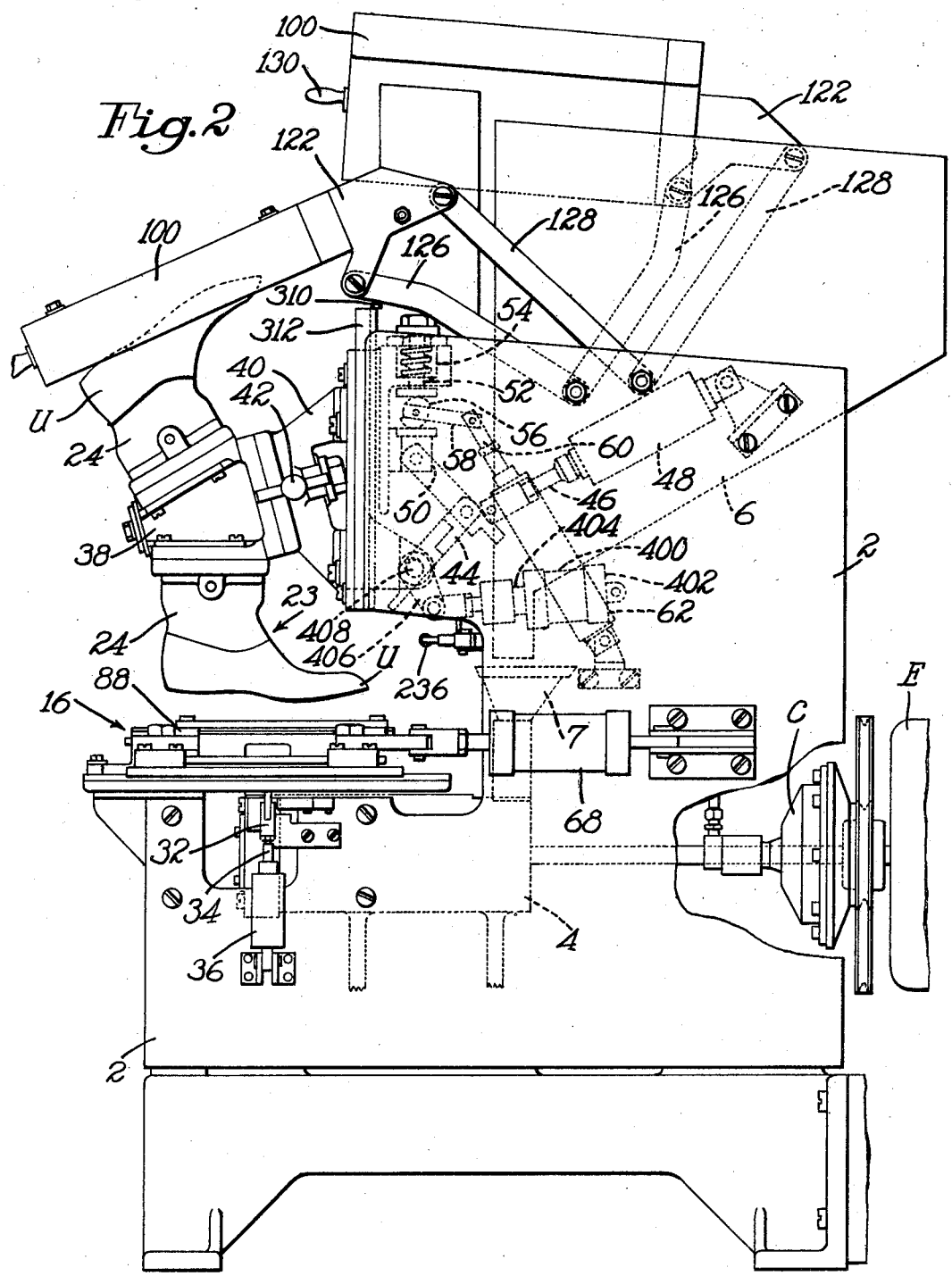
FIG. 2 is a side elevational view thereof.

Referring to FIG. 1, the invention is illustrated as embodied in a two-station machine for injection molding sole and heel units in situ onto shoe bottoms. The drawings illustrate a floor mounted machine having a base frame 2 in which there is mounted an electric motor E (FIG. 2) from which power is transmitted through a clutch C to a plasticator 4. The plasticator is fed material from a hopper 6 through a funnel 7. From the plasticator, fluid plastic or rubber is transmitted through two telescoping conduits 8 (FIG. 1) extending in opposite directions, each with a slightly upward inclination, to two nozzle housings 10 in two stations of the machine respectively, said stations being identified generally in FIG. 1 by reference characters A and B. The following description will be directed to the construction in station B, but it will be understood that it will be equally applicable to the construction in station A. The telescoping conduit 8 extending to the right of the plasticator 4 (as shown in FIG. 1) connects the plasticator 4 to the nozzle housing 10 which mounts an injection nozzle 12 (FIG. 4). When a passage 14 in the housing 10 extending from the conduit 8 to the injection nozzle 12 is open, fluid plastic is transmitted through the housing and the nozzle to a mold cavity which is formed by a mold assembly 16 comprising a bottom mold member 18 and two side mold members 20 and 22, and is closed at the top during the mold charging operation by a top mold member 23 which may, as illustrated in FIG. 2, comprise the bottom of a lasted shoe U mounted on a last or footform 24. The passage 14 is open or closed depending upon the position of a gate 26 connected by a link 28 to a pivotal member 30. The member 30 is positioned by a link 32 attached thereto and also attached to the end of a piston rod 34 operating in a sprue cylinder 36 (FIG. 1) pivotally fastened to the frame 2.

Referring to FIGS. 1 and 2, it will be seen that the present machine is provided with a footform housing 38 which supports two oppositely extending lasts or footforms 24 and which is rotatably secured to a carriage 40 mounted for vertical sliding movement on the front of the frame 2. Thus, while one footform is extending in a downward direction for a molding operation, the other footform mounted on the same housing is extending upwardly, in position for mounting a flat lasted upper, or for string lasting, and for external heating, as will be described herein below. Each housing 38 is provided with a locking lever 42 for locking the housing against rotation. The footform carriage 40 has connected thereto a toggle mechanism 44 connected to a toggle cylinder piston rod 46 operating in a toggle cylinder 48 pivotally anchored to the frame of the machine. When the toggle piston rod 46 is extended the movement of the toggle mechanism 44 urges the footform carriage 40 downward toward the mold assembly 16.

The upper end of the toggle mechanism 44 is connected to a cam follower 50 which is fixed to one end of a shaft 52. The other end of the shaft 52 is received in a spring housing 54 and spring biased upwardly. Rotatably connected to the shaft 52 and held between the head of the spring housing 54 and the cam follower 50 is a cam 56. A link 58 is at one end fixed to the cam 56 and at the other end pivotally connected to a bite cylinder piston rod 60 operating in a bite cylinder 62. After the toggle cylinder 48 has caused the carriage 40 to be lowered into an intermediate position with relation to the mold assembly 16, the bite cylinder piston rod 60 extends from the bite cylinder 62 and, through the link 58, causes rotation of the cam 56 so as to urge the cam follower 50, and thereby the toggle mechanism 44 and carriage 40, downwardly another increment of distance to firmly seat the footform 24 onto the mold assembly 16. The foregoing is a description of the existing state of the art.

Figure 5:
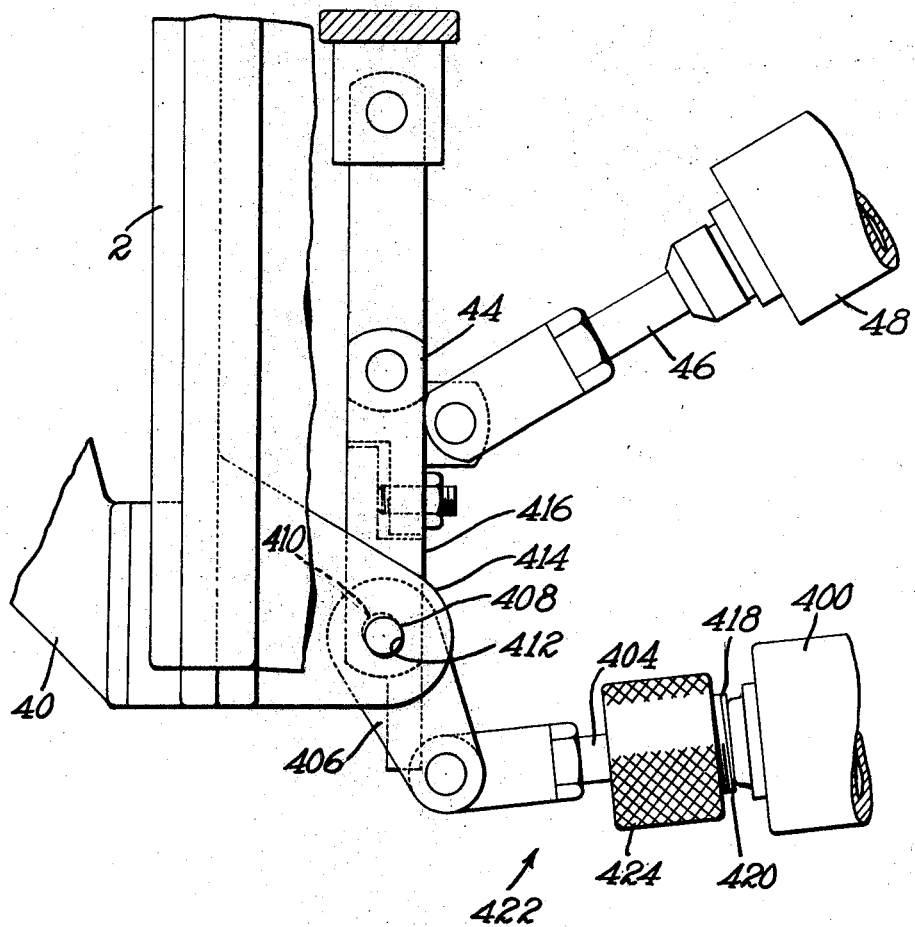
FIG. 5 is a detailed side elevational view of portions of the machine.

Referring to FIGS. 2 and 5, it will be seen that the machine is provided with a footform release cylinder 400 pivotally anchored at one end 402 to the frame 2 of the machine. The free end of a rod 404 extending from a piston disposed in the cylinder 400 is pivotally connected to one end of a link 406 which at its other end has fixed thereto a pin 408 having an eccentric intermediate portion 410. The pin 408 is also disposed in bores 412 in lugs 414 (one shown in FIGS. 2 and 5) which are integral with the carriage 40. In addition, the eccentric portion 410 of the pin 408 is disposed in a member 416 of the toggle mechanism 44.

Aften an injection operation is completed, the footform release cylinder 400 is actuated to cause the rod 404 to be drawn into the cylinder 400. Such movement of the rod 404 causes the link 406 to rotate the pin 408. Rotation of the pin 408 causes the eccentric portion 410 of the pin to move in a counterclockwise direction and hence downwardly with respect to the member 416, as viewed in FIGS. 2 and 5. The toggle mechanism 44 is held rigid and therefore maintains the eccentric at its position with relation to the mold assembly. The lugs 414, however, are fixed to the footform carriage 40 and are therefore movable. Rotational movement of the pin 408 causes the ends of the pin to move upwardly with relation to the plane of the mold assembly, thereby causing upward movement of the lugs 414 and the footform carriage 40. Upward movement of the footform carriage causes movement of the footform adjacent the mold assembly in a direction outwardly from the mold assembly. Such footform movement relieves the pressure of the injection molding material in the sole mold cavity.

In order to adjust the length of the rod 404 and thereby the degree of movement of the pin 408 and thereby the degree of movement of the footform, the rod may comprice two components, such as a first component 418 having an externally threaded portion 420 and a second component 422 having a rotatable member 424 having internal threads engageable with the threaded portion 420. Accordingly, by screwing or unscrewing the member 424 on the threads 420, the length of the rod 404 may be selected. By predetermining the length of the rod 404, the starting position of the pin 408 may be set, and thereby the position at which the pin will be disposed at the end of a stroke of the rod 404. This feature is particularly beneficial when there is a change in the injection molding material to a material having a substantially greater or lesser tendency to flow between the side mold members and the footform.

Referring to FIGS. 3 and 4, the side mold members 20, 22 are advanced into their mutually closed positions by the concomitant operation of two side mold cylinder piston rods 64, 66 which are extensions of pistons which operate in side mold cylinders 68 (one shown in FIG. 2) attached to the frame 2. When the piston rods 64, 66 move forwardly, the side mold members 20, 22 are caused to move toward each other and toward the bottom mold member 18. An adjustable stop 92 is engaged by a link 88 to stop the movement of the side mold member 20, 22 at the centerline of the bottom mold member.

Referring to FIG. 2, there is provided on the machine means for heating the lasted upper in the machine before subjecting the upper to the molding operation. A heat tray 100 is provided which may be pulled down over the footform and upper by the operator. Arms 126, 128 pivotally interconnect a heat tray holder 122 and the frame of the machine, so that the heat tray may rest in the out-of-the-way position, as indicated in FIGS. 1 and 2, or may be pulled down over the footform as is illustrated in FIG. 2. To facilitate hand operation, the tray is equipped on its forward face with a handle 130.

The pneumatic circuit of the prior art machine above referred to, which affords a highly automated operation, will now be discussed. FIGS. 6 and 7 show the pneumatic circuit for one station; however, it will be appreciated that the circuit for the second station is essentially the same. Air from a main air line 200 (FIG. 6) passes through an air filter 202 and a main air pressure regulator 204. The main air line 200 may also be equipped with a main air pressure gauge 206 and an air system oiler 208. In addition, the main air line 200 may be provided with a main air dump valve 210. Air in the main line 200 flows to a side mold solenoid valve 212. In addition, main air is fed to a side mold pilot valve 214 which directs air to a side mold four-way valve 218. Main air is also directed through the side mold four-way valve 218 to the head end of the station's two side mold cylinders 68.

Main air is also directed to a selector valve 220 which may be set for either one of two modes of operation. The selector valve in the position shown in FIG. 6 is for "top closure" operation. In this mode of operation the last mold member to enclose the mold cavity is the footform with an upper mounted thereon. The second position of the selector valve 220 permits the machine to operate as a "side closure" type machine. In the side closure operation the mold cavity is completed by the advance of the side mold members upon the footform and bottom mold member. Inasmuch as the top closure method of injection molding is prevalent in this country the operation of the pneumatic circuit for this type of molding will be fully described.

As shown in FIG. 6, main air passes through the selector valve 220 to a toggle-up signal valve 222 and is transmitted through the toggle-up signal valve 222 to the side mold pilot value 214 to maintain that valve in the position shown in FIG. 6. Main air from the selector valve 220 is also directed through an air line 224 to a bite cylinder four-way valve 226 (FIG. 7) and from that valve to the rod end of the bite cylinder 62. Main air in the main air line 200 also travels to a cycle reset valve 228 (FIG. 6) and also to a toggle cylinder four-way valve 230. Main air passes through the toggle cylinder four-way valve 230 and into the rod end of the toggle cylinder 48 and through an air line 232 to a plasticator purge valve 234 (FIG. 7). Main air is also fed from the main air line to a toggle-down signal valve 236 (FIG. 6) and to a telltale operating valve 238 (FIG. 7). In addition, main air passes from the main air line 200 to a sprue cylinder four-way valve 240 and from there to the rod end of the sprue cylinder 36 and also through an air line 242 to the toggle-down signal valve of the other station. Main air also passes through a pressure reducing valve 244 which may be equipped with a pressure gauge 246 to a clutch four-way valve 248. Main air also is directed from the main air line 200 to the clutch four-way valve 248 normally to maintain the clutch valve in the position shown in FIG. 7.

In order to start a cycle of operations the operator depresses a cycle start button 250 on a cycle start valve 252 (FIG. 6) which permits air from the sprue cylinder four-way valve of the other station to pass from an air line 254 through the cycle start valve 252 to actuate the toggle cylinder four-way valve 230. Actuation of the toggle cylinder four-way valve 230 sends main air to the head end of the toggle cylinder 48 and exhausts air from the rod end of the toggle cylinder. The movement of the toggle cylinder piston rod 46 in the toggle cylinder 48 releases the signal valve 222 and another signal valve 256, and depresses the toggle-down signal valve 236. Depression of the toggle-down signal valve 236 permits main air to flow through that valve and to the toggle-up signal valve 222. The toggle-up signal valve has also been shifted by the movement of the toggle cylinder piston rod 46 and is in position to permit the flow of main air from the toggle-down signal valve 236 to the side mold pilot valve 214 to retain the side mold pilot valve in the position shown in FIG. 6. Shifting of the toggle-down signal valve 236 also permits main air to travel through an air line 258 to shift the bite cylinder four-way valve 226 (FIG. 7). Movement of the toggle cylinder piston rod 46 also permits the signal valve 256 to be shifted by its spring, releasing the holding pressure on a timer reset valve 262.

Shifting of the bite cylinder four-way valve 226 (FIG. 7) causes main air to flow through a pressure reducer 264 to the head end of the bite cylinder 62 and exhausts the rod end of the bite cylinder. Air in the line 258 also goes through a time delay valve 268 having an accumulator 270 and thence to the timer reset valve 262. From the timer reset valve 262 air passes through a sprue shuttle valve 272 to shift the sprue cylinder four-way valve 240. When the sprue cylinder four-way valve shifts, main air passes through an air line 274 through the sprue cylinder valve 240 and into the head end of the sprue cylinder 36. The sprue cylinder valve 240 also exhausts from the rod end of the sprue cylinder 36. The movement of the sprue cylinder piston rod 34 actuates a plasticator sprue valve 280 which permits air from the sprue shuttle valve 272 to pass through to a clutch shuttle valve 282 and thence to the clutch four-way valve 248 which is caused thereby to shift and allow air to operate the spring biased air clutch C. The air clutch mechanically interconnects the plasticator and the electric motor which runs continuously. It is at this point that injection commences.

An air telltale 286 is located in the mold cavity. Air from the sprue shuttle valve 272 passes through a restricter 288 and through the air telltale 286 into the mold cavity. When the injected material has covered the air telltale 286 so that air can no longer flow therethrough, back pressure builds up in an air line 290 until the telltale operating valve 238 shifts. When the telltale operating vavle shifts, main air passes through that valve to shift the timer reset valve 262 so that air from the line 258 is directed to a spring biased timer actuating cylinder 292. Air from the timer reset valve 262 also flows through an air line 294 to a shuttle valve 296 (FIG. 6) to re-set the cycle start valve 252.

In accordance with the present invention, when the timer actuating cylinder piston rod 298 extends, it contacts a footform release cylinder actuating switch 450 and an electrical limit switch 300 which starts an electrical timer (not shown) having set therein the desired cooling time. The actuating switch 450 causes shifting of a footform release valve 452 (FIG. 7) which permits air from the main air line 200 to pass through an air line 454 to the rod end of the footform release cylinder 400 to cause drawing in of the rod 404.

When the timer reset valve 262 (FIG. 7) shifts, the clutch four-way valve 248 exhausts the air clutch, thereby causing termination of the injection operation. The sprue cylinder four-way valve 240 shifts back to the position shown in FIG. 7 permitting main air to enter the rod end of the sprue cylinder 36. The electrical timer, after a proper cooling interval, sends an electrical signal to the side mold solenoid valve 212 (FIG. 6) causing that valve to shift thereby directing main air through a shuttle valve 302 to the side mold pilot valve 214 to shift that valve which in turn permits main air to shift the side mold four-way valve 218 which directs air to the rod end of the side mold cylinders 68, causing the side mold members to open. When the side molds are open a side mold signal valve 304 is actuated which directs air coming through the side mold pilot valve 214 to a shuttle valve 206 and thence to the toggle cylinder four-way valve 230, shifting the toggle cylinder valve 230 to allow air into the rod end of the toggle cylinder 48, returning the toggle cylinder piston so as to raise the footform carriage 40.

As the toggle cylinder piston rod 46 is drawn into the toggle cylinder 48 the toggle-down signal valve 236 is released and the toggle-up signal valve 222 and the signal valve 256 are actuated. The actuation of the signal valve 256 (FIG. 7) permits air to pass through that valve and to the timer reset valve 262, shifting the timer reset valve, thereby exhausting the timer actuating cylinder 292 which causes resetting of the electrical timer for the next cycle.

Exhausting of the timer actuating cylinder 292 also causes deactivation of the footform release cylinder actuating switch 450 which in turn permits shifting of the footform release valve 452 whereby to exhaust the rod end of the footform release cylinder 400 and pressurize the head end to cause extension of the rod 404 from the cylinder 400.

The side mold solenoid valve 212 is returned by the spring to the position shown in FIG. 6. The toggle-down signal valve 236 (FIG. 6), having been released by the toggle cylinder piston rod 46 shifts, allowing the bite cylinder four-way valve 226 (FIG. 7) to shift to exhaust the head end of the bite cylinder 62. The actuation of the toggle-up signal valve 222 (FIG. 6) by the toggle cylinder piston rod 46 directs air from the selector valve 220 to shift the side mold pilot valve 214 back to its idle position. The circuit is now in condition for the start of a new cycle. To facilitate the proper actuation of various pneumatic valves, the above-described circuit is provided with pressure reducers which, for the sake of clarity, have not been included in the drawings or discussion.

As an alternative to the footform release cylinder arrangement above described, the bite cylinder may, if desired, be adapted, in conjunction with an appropriate cam means, to receive air at its rod end after completion of an injection molding operation whereby to lift the footform slightly from the mold assembly.

The restrictor 288 (FIG. 7) is variable and may be adjusted to vary the sensitivity of the telltale operating valve 238. The restrictor is used as a size adjustment. If a large size sole is being molded, it is desirable to have the telltale operating valve remain open a short time longer than is the case for a small sole. Accordingly, the restrictor 288 is "tightened down," allowing less flow in the line 290 and putting less pressure on the telltale operating valve 238. Thus, after the telltale 286 is covered with injection molding material the time required for a pressure buildup on the valve 238 sufficient to shift that valve is longer than it was before the restrictor 288 was adjusted. The slight delay keeps the clutch four-way valve 248 open, permitting longer operation of the plasticator, thereby insuring the delivery of more fluid to the mold cavity.

The plasticator purge valve 234 is a manually operated valve which can be activated to initiate injection with the toggle cylinder not in position for a molding operation, to enable the operator to purge the plasticator of leftover or otherwise contaminated injection molding material. The cycle reset valve 228 (FIG. 6) is manually operated and upon operation causes the molds to open and the circuit to be re-set for the start of another operation.

In the event it is desired for the machine to operate as a side closure machine the operator manually shifts the selector valve 220 before initiating the next cycle. In this mode of operation the side molds remain open until the toggle-down signal valve has been actuated by the toggle cylinder piston rod. In this mode of operation the bite cylinder 62 is not actuated.

In operation, the operator first starts the electric motor E and connects the circuit with a source of pressurized air. He then pushes the purge valves 234 of both stations to clear out contaminated injection material left in the plasticator 4 and conduits 8 from the previous use. After purging the plasticator and conduits, the operator pushes the cycle re-set valves 228 to insure that the side molds are open and the circuit is in condition for a molding operation.

The operator then places an upper onto one of the upright footforms 24. The upper may be a flat lasted upper, or an upper may be string lasted directly onto the footform. At any rate, once the upper is on the footform, the operator grasps the heat tray handle 130 and pulls the heat tray 100 toward the footform. As the heat tray moves toward the footform the heat radiating side, or open side, rotates from an upwardly facing position to a downwardly facing position and comes to rest just over the forepart of the lasted upper as shown in FIG. 2. An adjustable stop 310 engages a slide portion 312 of the footform carriage 40 to stop the downward movement of the heating tray. The operator then places a flat lasted upper, or string lasts an upper, on the upwardly extending footform in the second station and pulls the heat tray 100 down over the shoe. Having shoes on both upward extending footforms, the operator then returns to the first station and moves the heat tray back to its idle position.

By manipulation of the lever 42 the operator rotates the housing 38, causing the other footform to be brought into loading position and causing the footform having the lasted shoe thereon to move into position above the mold assembly 16. He then pushes the cycle start button for that station. The side cylinders cause the side mold members to close; the toggle cylinder moves the lower footform to an intermediate position with respect to the mold assembly; and the bite cylinder forces the footform downward slightly further to insure the footform's firm engagement with the mold assembly. Thereafter the sprue cylinder causes the gate member 26 to open the sprue passage 14, and the air clutch C interconnects the motor E and the plasticator to start the injection of molding material into the mold cavity. The mold charging operation continues until the air telltale system, described above, is actuated causing termination of the injection of fluid into the mold cavity. The footform release cylinder 400 is then actuated to permit the footform to be raised from the remainder of the mold assembly whereby to relieve the pressure in the mold cavity. The permitted movement of the footform is not great enough to allow escape of material from the mold cavity.

The first station then remains idle for a period of time previously set in the electrical timer. Meanwhile, the operator places an upper on the upwardly extending footform of that station and pulls the heat tray down over the newly mounted upper. Since the carriage is now in the mold charging position the tray fits over the lasted upper as shown in FIG. 2.

The operator returns to the second station, removes the heat tray from the upwardly extending footform, rotates the heat tray from the upwardly extending footform, rotates the footform housing of that station and pushes the cycle start button for the second station. He then places an upper on the upwardly extending footform of that station; and pulls the heat tray down over the newly mounted upper. In the meantime the electrical timer in the first station will have caused the side mold members of that station to open and the carriage to be elevated to its uppermost position. The operator then returns to the first station, removes the heat tray and rotates the footform housing. He removes the sprue from the newly molded sole with a sharp instrument and removes the upper with the sole unit molded thereon from the upwardly extended footform. He may then place another upper on that footform, pull down the heat tray and start a new injection molding cycle. The two stations of the machine are pneumatically interconnected so that when one station is injecting, the toggle cylinder of the other station is not operative. This prevents simultaneous injection into both mold cavities which would cause undesired fluctuation of injection pressure.

The above description of the operation of the machine is intended to be illustrative only and may obviously be changed to meet varying conditions such as the length of time heating of the upper is required and the time required to cool the molded unit so that it may safely be removed from the mold cavity.

Having thus described our invention what we claim as new and desire to secure by Letters Patent of the United States is:

1. An injection molding machine for molding footwear soles directly onto lasted uppers, said machine comprising a mold assembly defining a mold cavity open on one side, a footform for receiving a lasted upper thereon, first means for moving said footform toward said mold assembly to engage said upper with said mold assembly whereby to enclose said mold cavity, means for filling said mold cavity with injection molding material, and second footform moving means responsive to the filling of said mold cavity for moving said footform in a direction away from said mold assembly, said second means being readily adjustable to provide movement of said footform through a predetermined distance sufficient to relieve pressure in the mold cavity but insufficient to permit escape of material from the mold cavity.

2. The machine of claim 1 wherein said footform is connected to a carriage and said second footform moving means comprises an element having a cam surface operatively connecting said first footform moving means with said carriage.

3. The machine of claim 2 wherein said element is a pin having a cam surface formed thereon and interconnecting said carriage with said first footform moving means.

4. The machine of claim 3 wherein said second footform moving means comprises power means for rotating said pin.

References Cited

UNITED STATES PATENTS 3,012,278 12/1961 Szerszynski.
3,056,165 10/1962 Berrill et al.
3,339,236 9/1967 Battell et al.

J. SPENCER OVERHOLSER, Primary Examiner

M. O. SUTTON, Assistant Examiner